United States Patent
Fuller (12)

(10) Patent No.: US 6,373,150 B1
(45) Date of Patent: Apr. 16, 2002

(54) ELECTRIC SERVICE LOAD LIMITER

(75) Inventor: Alan D. Fuller, Warren, PA (US)

(73) Assignee: Warren Electric Cooperative, Inc., Youngsville, PA (US)

( * ) Notice: Subject to any disclaimer, the term of this patent is extended or adjusted under 35 U.S.C. 154(b) by 0 days.

(21) Appl. No.: 09/524,865

(22) Filed: Mar. 14, 2000

(51) Int. Cl.[7] .................................................. H02J 1/00
(52) U.S. Cl. ....................................................... 307/39
(58) Field of Search ............................ 307/140, 38, 40, 307/113, 115, 39, 107; 365/492, 493, 483; 363/56; 324/142

(56) References Cited

U.S. PATENT DOCUMENTS

| | | | |
|---|---|---|---|
| 4,034,233 A | 7/1977 | Leyde | 307/41 |
| 4,211,933 A | 7/1980 | Hedges et al. | 307/35 |
| 4,562,550 A * | 12/1985 | Beatty et al. | 307/3 |
| 4,803,632 A | 2/1989 | Frew et al. | 324/142 |
| 5,289,109 A | 2/1994 | Summe | 323/277 |
| 5,457,621 A * | 10/1995 | Munday et al. | 363/56 |
| 5,753,983 A * | 5/1998 | Dickie et al. | 307/141.4 |
| 5,862,045 A * | 1/1999 | Halamik et al. | 363/21 |
| 6,229,295 B1 * | 5/2001 | Hemminger et al. | 324/142 |

* cited by examiner

*Primary Examiner*—Edward H. Tso
*Assistant Examiner*—Ba Tibbits
(74) *Attorney, Agent, or Firm*—Edward W. Goebel, Jr. Esq.; McDonald, Illig, Jones & Britton LLP (57) ABSTRACT

An electric service load limiter limits the level of current a consumer receives from an electric utility power line. The load limiter is set either at the consumer's location or through a remote control such as an automatic meter reading system in the load limiter. An electronically controlled power relay switch, connectable between the utility power line and the consumer's electric power circuit, couples electric current to the consumer's power circuit and interrupts the flow of current through the consumer's power circuit when the level of current flow exceeds a predetermined maximum level. A sensor produces a sensor signal which is proportional to the amount of current flowing through the consumer's power circuit and is coupled to a logic circuit. The logic circuit compares the resulting sensor signal to a signal representing the maximum current level of the consumer's power circuit, as preselected by the consumer's electric utility company. If the sensor signal reflects a level of current greater than the preselected maximum level, the logic circuit causes the automated power switch to interrupt the flow of current from the utility power line through the consumer's power circuit, thereby disrupting electrical service to the consumer. A reset switch circuit is coupled to the power relay switch. The reset switch may be either manually operated or automatically operating using a timing circuit and causes a reset circuit to produce a single reset signal which is limited in duration each time the reset switch is operated after the interruption of the flow of current through the consumer's power circuit. The reset signal causes the automated power switch to couple current from the utility power line to the consumer's power circuit and restore electric service to the consumer.

19 Claims, 6 Drawing Sheets

ELECTRIC SERVICE LOAD LIMITER

BACKGROUND OF THE INVENTION

The present invention relates to electric service load limiters, and more particularly, to an electric service load limiter for limiting the amount of electricity that is allowed to pass from a power line and through an electrical power leg supplying electricity to a consumer.

In the electric utility industry, household consumers pay for electric service according to the amount of energy consumed. Therefore, utility companies normally bill these customers in proportion to the total amount of electrical current drawn during a particular billing period. When such a customer becomes seriously delinquent in paying a bill, the utility company has the option of shutting off electric service until the bill is paid. While this usually is an effective incentive to cause a household consumer to make payments that are past due, it also presents potential regulatory problems. Local statutes often prohibit utilities from totally discontinuing service to the extent that a consumer is unable to operate essential appliances such as a furnace, a refrigerator, or a water pump. Regulations of this type typically prohibit discontinuing electrical service in the winter when operation of a furnace can be essential. For this reason, a utility company wishing to restrict a delinquent consumer's electricity consumption must be able to do so without seriously disrupting the consumer's essential electricity requirements.

Previous attempts to limit electrical consumption by delinquent household consumers have included mechanical circuit breaker-type load limiters. These limiters characteristically incorporate thermal or magnetically-triggered mechanisms that trip or automatically disconnect electrical power legs leading into a consumer's building. The purely mechanical functioning of these designs often means that their proper operation requires constant, non-fluctuating electrical, physical or environmental conditions. For example, a transient current, such as is typically present in a home electrical circuit during the start of a major appliance, is sometimes sufficient to cause a mechanical load limiter to automatically disconnect, even though the total combined draw of all working electrical devices on the circuit when they are at equilibrium is well under the load limiter's set point, or maximum allowed current draw. Excessive environmental heat can similarly affect the operation of thermally-triggered mechanical units. In a purely mechanical load limiter, the load limiter's set point is also susceptible to change as the mechanism continues to wear over time, reducing the unit's overall reliability.

To allow delinquent customers to continue drawing essential electricity requirements, mechanical service load limiters typically allow for customer resetting after automatic disconnection or tripping. A customer must manually restore service by resetting mechanical circuit breakers in the load limiters after an excessive, nonessential load has been removed. When a thermally actuated mechanical load limiter trips due to a customer's excessive current draw, it is often difficult or impossible for a customer to immediately reset the load limiter because the overheated breaker mechanism remains hot for awhile. Thus, the consumer's home may be without electricity for awhile. Additionally, due to their design, mechanical units are highly susceptible to customer tampering. For example, customers sometimes bypass a mechanical load limiter by simply taping or jamming a circuit breaker reset button into the reset position. In addition to rendering the unit inoperable, such tampering can also lead to overheating and damage, significantly reducing a load limiter's service life.

A further disadvantage of existing mechanical load limiters has been the lack of selectable set point current levels on a single unit. Since previous load limiters depend on specific mechanical conditions being met before tripping, they are normally limited to a single set point level. As a result, a utility company must purchase and stock separate units for each different set point level it uses. It follows that a different load limiter must be installed for each individual customer according to the customer's essential requirements. A utility company must also incur the added expense of installing a new unit when a new customer with different essential electric service requirements occupies the home of a previous customer or whenever an existing customer's essential electricity requirements change. This also further precludes the possibility of setting a customer's set point level remotely from a central location.

Previous attempts to limit electrical loads have also included the incorporation of solid state electronic monitoring and logic circuits for removing discrete loads from a customer's power circuit after consumption surpasses a set-point maximum. U.S. Patent to Hedges (U.S. Pat. No. 4,211,933) discloses a method and U.S. Patent to Leyde (U.S. Pat. No. 4,034,233) discloses an apparatus and method for automatically limiting total current in a power circuit to a set-point maximum by sequentially disconnecting individual loads from a power circuit until total current drawn ceases to surpass the set-point maximum. Individual loads remain disconnected only as long as total current flowing through the power circuit continues to surpass the set-point maximum. Thereafter, disconnected loads are automatically reconnected to the power circuit, and no manual resetting by the consumer is required. At no time is all current on the building's power circuit entirely disconnected from a utility power line. This substantially reduces a circuit's effectiveness as a negative incentive for a consumer to make past due utility payments. Moreover, such circuits require a consumer to preset the priority in which loads are disconnected to selectively determine which loads are first terminated during an overload condition. In the event that load priority is improperly set or programmed, such an arrangement could effectively serve to terminate essential services while failing to terminate nonessential services or electrical conveniences to the consumer, thereby achieving the opposite of the desired result.

Other solid state devices specifically limit the amount of current that may travel through a consumer's power circuit during a set interval. For example, U.S. Patent to Summe (U.S. Pat. No. 5,289,109) discloses a circuit including a current sensing resistor, a current-controlling P-channel field effect transistor and an NPN bipolar transistor. When the magnitude of a load current flowing through the circuit reaches a predetermined current limit value, the conduction of the current-controlling P-channel transistor is controlled to limit the load current flowing through the circuit. Current flowing through a power circuit is never permitted to exceed the set point maximum, regardless of the number of loads placed on a circuit. There is no trip mechanism and no means to automatically disconnect excessive individual loads. Thus, even in the event of an excessive total load, the design neither terminates nor automatically removes individual loads from the power circuit. While such devices may be suitable for imposing a strict limit on the amount of current that is permitted to be drawn through a power circuit, they are inherently unsuited for use as utility load limiters. In the absence of a trip or disconnect mechanism, such devices are alone incapable of signaling overload conditions. Rather than disconnecting loads in excess of a set-point maximum, such circuits merely distribute the limited current among the various loads that remain connected to the circuit, resulting in insufficient power to adequately maintain all connected loads. As a result, even essential appliances could be adversely affected, contrary to the desired effect of limiting the amount of power supplied to a consumer. Moreover, if a consumer becomes content with the substandard but barely functioning condition of one or more of his electrical appliances, the customer may be able to budget electricity consumption in a way that allows for continued delinquency without payment.

SUMMARY

According to the principles of this invention, an electric service load limiter limits the level of current a consumer receives from an electric utility power line. The load limiter uses an electronically controlled power relay switch, connectable between the utility power line and the consumer electric power circuit, to couple electric current to the consumer's power circuit and to interrupt the flow of current through the consumer power circuit when the level of current flow exceeds a predetermined maximum level. The load limiter has a sensor that produces a sensor signal which is proportional to the amount of current flowing through the consumer power circuit. The sensor signal may be amplified and/or converted into a direct current signal, or otherwise processed as desired, before being coupled to a logic circuit. The logic circuit compares the resulting sensor signal to a signal representing the maximum current level oft he consumer's electric power circuit which was preselected by the utility. If the sensor signal reflects a level of current greater than the preselected maximum level, the logic circuit causes the automated power switch to disconnect the consumer's electric power circuit from the utility power line, thereby disrupting electrical service to the consumer. A reset switch circuit is coupled to the power relay switch. The reset circuit produces a single reset signal each time the reset circuit is operated. This reset signal causes the automated power switch to couple current from the utility power line to the consumer's electric power circuit.

In one embodiment of this invention, the reset circuit includes a manual switch which can be switched between a first condition and a second condition. The reset circuit produces a reset signal only when the manual switch is switched from the first condition to the second condition to cause the power relay switch to begin to couple current from the utility power line to the consumer's electric power circuit. However, the manual switch must thereafter be switched from the second condition back to the first condition before the flow of current from the utility power line can be restored after the flow of current is interrupted once again. As a result, tampering with the manual switch to keep it in the posture which turns on the electric power cannot prevent the load limiter from interrupting electric power service.

Additionally, in another embodiment of this invention the reset switch circuit includes a manual switch that is connected to a capacitor that is separately charged for generating a reset signal while the switch is in a first condition. During normal operation, the capacitor is maintained in a charged stated by the separate power source. However, upon manual activation of the reset switch from its first condition to its second condition to connect the power leg to the consumer's building, the capacitor is removed from its separate power source and electrically connected to the logic circuit. This electrical connection causes the capacitor to discharge, resulting in a reset signal being coupled through the logic circuit to turn on the power relay switches and restore electrical continuity along the one or more power legs, restoring electrical service. To function once again, the reset switch must be fully restored from its second condition to its first condition to recharge the capacitor before another reset signal can be generated to turn on the power-removing relays. Thus, taping or fixing the reset switch into the reset position is ineffective for preventing disruption of electrical service. A customer who continually draws beyond his essential requirements must therefore physically return to the inconvenient locations of the reset switch and fully activate it. This inconvenience becomes an increasing nuisance if the delinquent customer's excessive usage of electricity continues.

In still another embodiment of the invention, the logic circuit includes a separate reference circuit for producing a set point voltage signal proportional to a desired predetermined maximum current level. The reference circuit may allow for variable settings so that different maximum current levels can be selected by the utility company.

One alternative embodiment of this invention achieves the effect of interrupting and resetting a consumer's electric service without requiring the consumer to manually reset the service load limiter after each interruption. The reset circuit is a reset time delay circuit. The reset time delay circuit is coupled through the logic circuit to the automated power switch. In this alternative embodiment, a consumer also causes the power relay switch of the service load limiter to discontinue his electric power by drawing current beyond the predetermined maximum limit. However, the interruption of the electric current flow triggers the operation of the reset time delay circuit for a period of time which has been preselected by the utility company. During this period of time the consumer's electric service is off. At the end of the delay period, the reset timing circuit produces a reset signal which causes the power relay switch to once again couple current from the utility power line to the consumer's electric power circuit to restore the consumer's electric service. However, the delay before electric service is automatically restored serves a nuisance function and provides a consumer with an incentive to either limit the consumption of electricity or pay the delinquent bill.

When the consumer's electric power circuit being monitored includes more than one power leg onto each of which different appliances and equipment can be connected, a separate sensor can be used for each power leg. A sensor signal from each sensor can be compared with a signal representing the utility's selected maximum current level. A logic circuit associated with each power leg can cause all of the power to the consumer to be discontinued by actuating the power relay switches if it determines too much current is being drawn through one of the power legs. Additionally, the signal representing the maximum current level can be produced by a reference circuit having a plurality of settings, each representing a separate, selectable maximum current level. This reference circuit can be used where the service load limiter monitors the current flowing through one power leg or more than one.

Additionally, another alternative embodiment of this invention allows the operational mode of the load limiter to be selected so that the load limiter either (1) turns on the power relay switch so there is no restriction on the amount of power flowing through the power leg, or (2) limits current to the level of a predetermined magnitude as established by a referenced circuit, or (3) terminates all current flow by shutting off the power relay switch.

The load limiter of this invention can be made from solid state electrical and electronic components. These components enable the load limiter to be readily controlled from a remote location, if desired. Thus, through the use of an electronic communication device, such as a modem, one of the three operational modes of the load limiter can be selected from a remote location. Additionally, the setting of a reference circuit can be remotely adjusted to select a desired maximum current level for a particular consumer. Where a reset time delay circuit is used, the length of the interval between the time when the automated power switch disconnects electric current from a consumer power circuit and the time when electric service restored can also be adjusted from a remote location.

This invention does not reside in any one of the features of the service load limiter that are disclosed above and described in the Description of the Preferred Embodiments. Rather, this invention is distinguished from the prior art by its particular combination of features of the load limiter claimed below. Important features of the invention have been disclosed in the Detailed Description of the Preferred Embodiments as shown and described below to illustrate the best mode contemplated to date for carrying out this invention.

Those skilled in the art will realize that this invention is capable of embodiments which are different from those shown and that details of the structure of the service load limiter can be changed in various manners without departing from the scope of this invention. Accordingly, the drawings and descriptions are to be regarded as illustrative in nature and are not to restrict the scope of this invention. Thus, the claims are to be regarded as including such equivalent electric service load limiters as do not depart from the spirit and scope of this invention.

BRIEF DESCRIPTION OF THE DRAWINGS

For a more complete understanding and appreciation of this invention and many of its advantages, reference should be made to the following, detailed description taken in conjunction with the accompanying drawings wherein.

DETAILED DESCRIPTION OF THE PREFERRED EMBODIMENTS

Referring to the drawings, identical reference numerals 100 and above and letters designate the same or corresponding parts throughout the several figures shown in the drawings. The numerals below 100 are used to designate the pins on various commercially available integrated circuits to which wires, components and other integrated circuits are attached.

Figure 1:
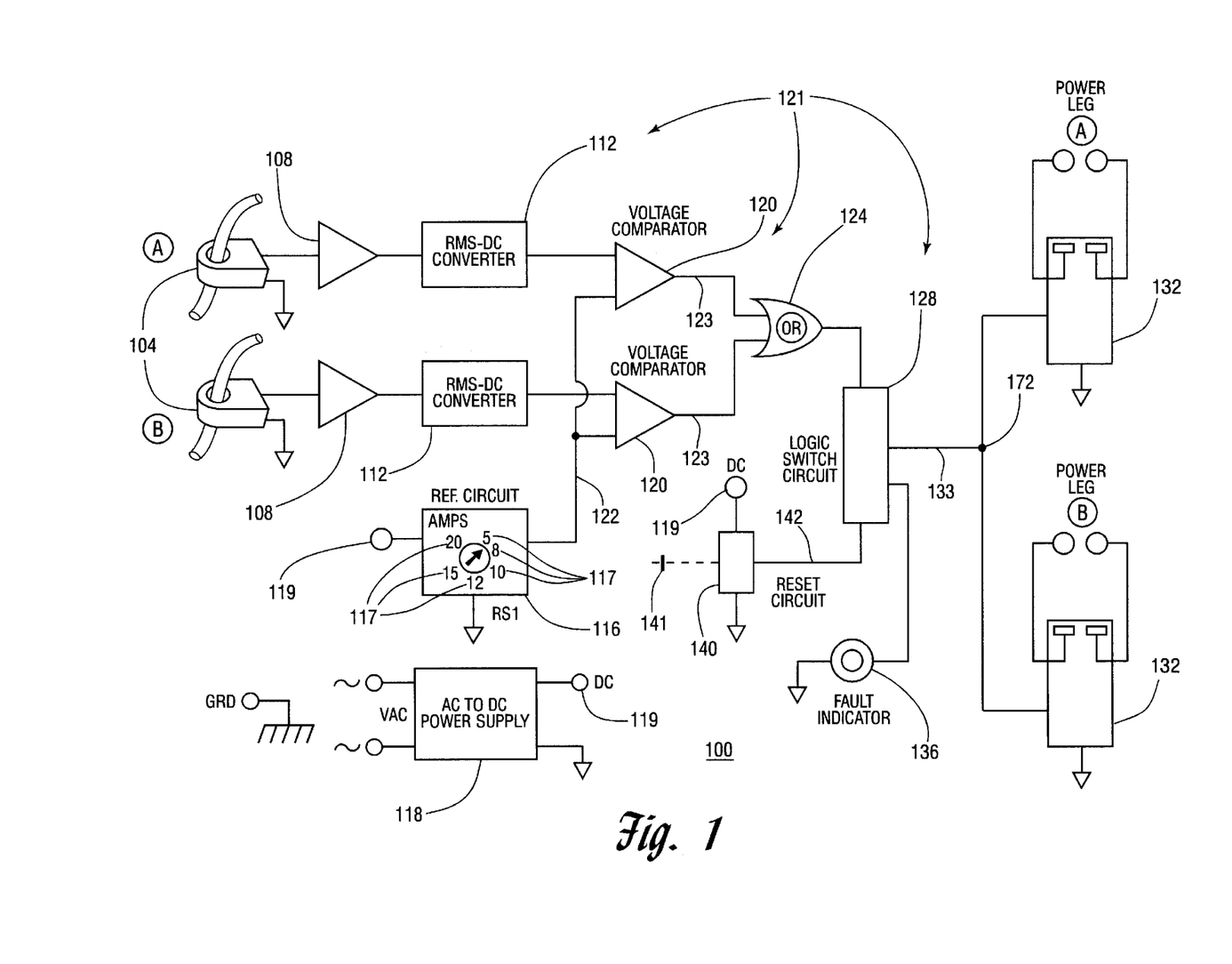
FIG. 1 is a block diagram of basic elements of the service load limiter as assembled in accordance with a preferred embodiment of this invention.

Elements of an illustrative electric service load limiter 100 provided according to this invention are shown in the block diagram of FIG. 1. The electric service load limiter 100 is configured to monitor a standard two-leg electric system as would typically provide service to an electric power circuit of a consumer's residential building such as a house or to an apartment. All essential components of the invention may be enclosed in a compact adaptor housing (not shown) to form an electric service load limiter adapter unit for mounting on an electric meter.

Sensors shown as current transformers 104 are each coupled to one oft he individual power legs A and B (not shown) of a consumer's electric power circuit for sensing the amount of current being drawn through each respective power leg. Each of the transformers 104 produces an AC sensor signal proportional to the amount of current sensed. The signal may then be amplified to facilitate voltage comparison through the use of an amplifier 108. The amplifier may, for example, be a low power, non-inverting AC operational amplifier with a gain of ten or of a similar magnitude. The amplified AC signal may then be passed to an RMS to DC converter 112 to produce a DC sensor signal corresponding to the level of current passing through the respective power leg 104. Those skilled in the art will recognize that the sensor signal could be processed using any of a number of other types of electronic signal processing components.

A logic circuit 121 receives the amplified and converted DC sensor signal and produces a logic signal when the sensor signal which came from one of the transformers 104 indicates the amount of current being drawn through a power leg is greater than a preselected maximum amount of current allowed by the electric utility company. The logic circuit 121 includes for each power leg a voltage comparator 120, a logical output or OR circuit 124 and a logic switch circuit 128.

Figure 5:
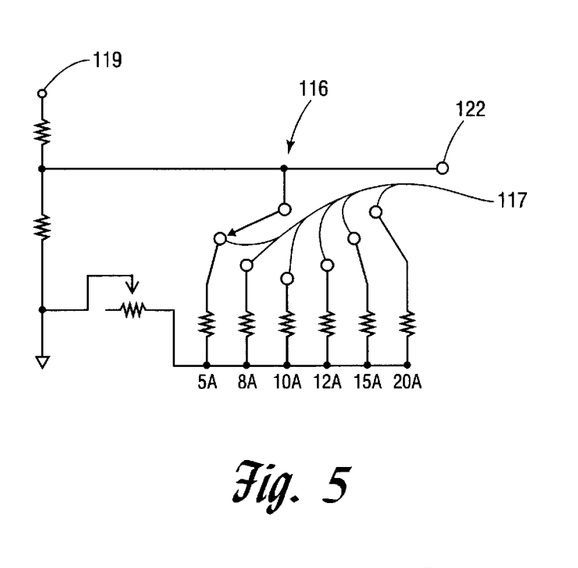
FIG. 5 is an electrical schematic diagram of an illustrative set-point reference circuit appropriately used in conjunction with an embodiment of this invention.

The DC sensor signal produced by the converter 112 is compared by the voltage comparator 120 to a set-point voltage produced by a separate reference circuit 116. The reference circuit 116 is powered by a power supply 118 which provides a constant DC voltage at its output 119. The reference circuit 116 may include a voltage divider or other components for enabling a utility to select a variable set-point voltage corresponding to each possible current level to the set for the load limiter 100. FIG. 5 shows an example of an appropriate reference circuit 116 having a voltage divider with six selectable set-points 117 to divide the voltage from the power supply output 119 into six voltage levels at reference circuit output 122. The six voltage levels correspond to six possible current levels ranging, by way of example, from 5 to 20 amperes. Those skilled in the art will appreciate that the reference circuit 116 may be constructed to accommodate any desired range or grouping of selectable current levels and corresponding voltage set-points at its output 122.

Referring again to FIG. 1, comparison of the set-point voltage at the reference circuit output 122 with the voltage level of each power leg's DC sensor signal is accomplished with a separate DC voltage comparator 120 for each respective power leg which is feeding current to a consumer's electric power circuit. During normal operation when the current used by a consumer is less than the preselected maximum current level, the magnitude of the voltage of each power leg's corresponding DC sensor signal is less than the set-point voltage at output 122 of the reference circuit 116. This results in a low voltage state, or a FALSE condition, at the output 123 of the voltage comparator 120 which is related by the voltage comparator 120 to the logical output or OR circuit 124. When the amount of current flowing through one or both of the power legs is greater than the maximum current level selected on the reference circuit 116, the corresponding voltage comparator 120 in turn relates a high state, or TRUE condition, at its output 123 and to the OR circuit 124.

The logic switch 128 is responsive to the condition of the OR circuit 124 to produce a signal when an overload occurs. The logic switch circuit 128 may comprise any one of a multitude of logical controlling devices that can be used to turn on and turn off one power relay switch 132 or, if there are more than one power relay switches 132, turn them all off at the same time. As will be explained with respect to FIG. 2, in the preferred embodiment logical switch 128 comprises a portion of a CMOS analog relay logic switch circuit.

A power relay switch 132 is connectable between the utility power line and the consumer's power circuit and can be actuated to couple electric current to the consumer's power circuit. The power relay switch 132 can also be actuated to interrupt the flow of electric current to the consumer's power circuit when the electric current being drawn through this power circuit is above a maximum allowable level. When more than one power leg is being monitored, each power leg will have a separate power relay switch 132 connected between it and an electric power line. The power relay switches 132 may be solid state switching devices and are each connected to a respective power leg. Each power relay switch 132 is coupled to an output 133 of the logic switch circuit 128 of the logic circuit 121. This enables the power relay switch 132 to interrupt the flow of current at a time when a logic signal at output 133 indicates current flow through one or both of the power legs is above the predetermined maximum.

A reset circuit 140 can produce a reset signal at its output 142 which is coupled to the power relay switches 132 to turn them on. In one embodiment of this invention the reset circuit 140 is a reset switch circuit including a manual switch indicated as 141 in FIG. 1. This manual switch 141 can be switched between a first condition and a second condition. The reset switch circuit 140 is a one-shot circuit which can only produce a reset signal when the manual switch 141 is switched from the first condition to the second condition. This would occur, for example, when the manual switch 141 is first actuated by a consumer to turn on the power. The manual switch 141 must be actuated once again, to return it to its first condition, before the reset circuit 140 to produce a reset signal which will cause the power relay switches 132 to conduct current once again, after power is turned off by a consumer drawing more power than set by the electric utility company using the reference circuit 116.

A typical electric service load limiter would include a fault indicator 136 that informs a consumer that current use is above the predetermined maximum level. In the preferred embodiment of this invention, the fault indicator is a light emitting diode, connected to the logic switch circuit 128. The light emitting diode fault indicator 136 lights up when a TRUE condition from the OR circuit 124 causes the switch circuit 128 to produce a logic signal that turns off the power relay switch 132.

The operation of the electric service load limiter shown in FIG. 1 is begun by actuating manual switch 141 of reset switch circuit 140. This causes the manual switch 141 to switch from a first condition to a second condition so that the reset switch circuit 140 produces a reset signal which is coupled through output 142 and logic switch circuit 128 to output 133. The reset signal causes the power relay switches 132 to couple current from an electric power line to power legs A and B of a consumer's electric power circuit.

Sensors 104 then each produce a sensor signal in proportion to the amount of current flowing from the utility power line and through the power legs A and B, respectively of the consumer's electric power circuit. Each sensor signal is amplified by an operational amplifier 108 and converted to a DC voltage by converter 112. The logic circuit 121, comprising voltage comparators 120, OR circuit 124 and logic switch circuit 128, responds to the DC sensor signal to produce a logic signal when the sensor signal indicates the amount of current being drawn through one of the power legs is greater than the desired maximum level. The DC sensor signal from each power leg is compared with the reference signal from reference circuit 116. When the sensor signal from one of the power legs indicates that the current being drawn through that power leg is greater than the predetermined maximum current determined by a utility, voltage comparator 120 produces a signal which is coupled through or gate 124 and logic switch circuit 128 to produce a logic signal at output 133. This logic signal is coupled to the power relay switches 132 to turn them off so that they no longer couple current from the utility power line to the individual power legs A and B of the consumer's electric power circuit. The fault indicator 136 warns the consumer that the level of current drawn through the consumer's power circuit was greater than the predetermined maximum current limit.

The reset switch 141 must be returned from its second condition to its first condition before it can turn on the power relay switches 132. When the manual switch 141 is actuated from its first condition to its second condition once again, a reset signal is coupled through the logic switch circuit 128 into output 133. The reset signal then turns on the power relay switches 132 to enable them to couple current from the utility power line to the power legs A and B of the consumer's power circuit.

Figure 2:
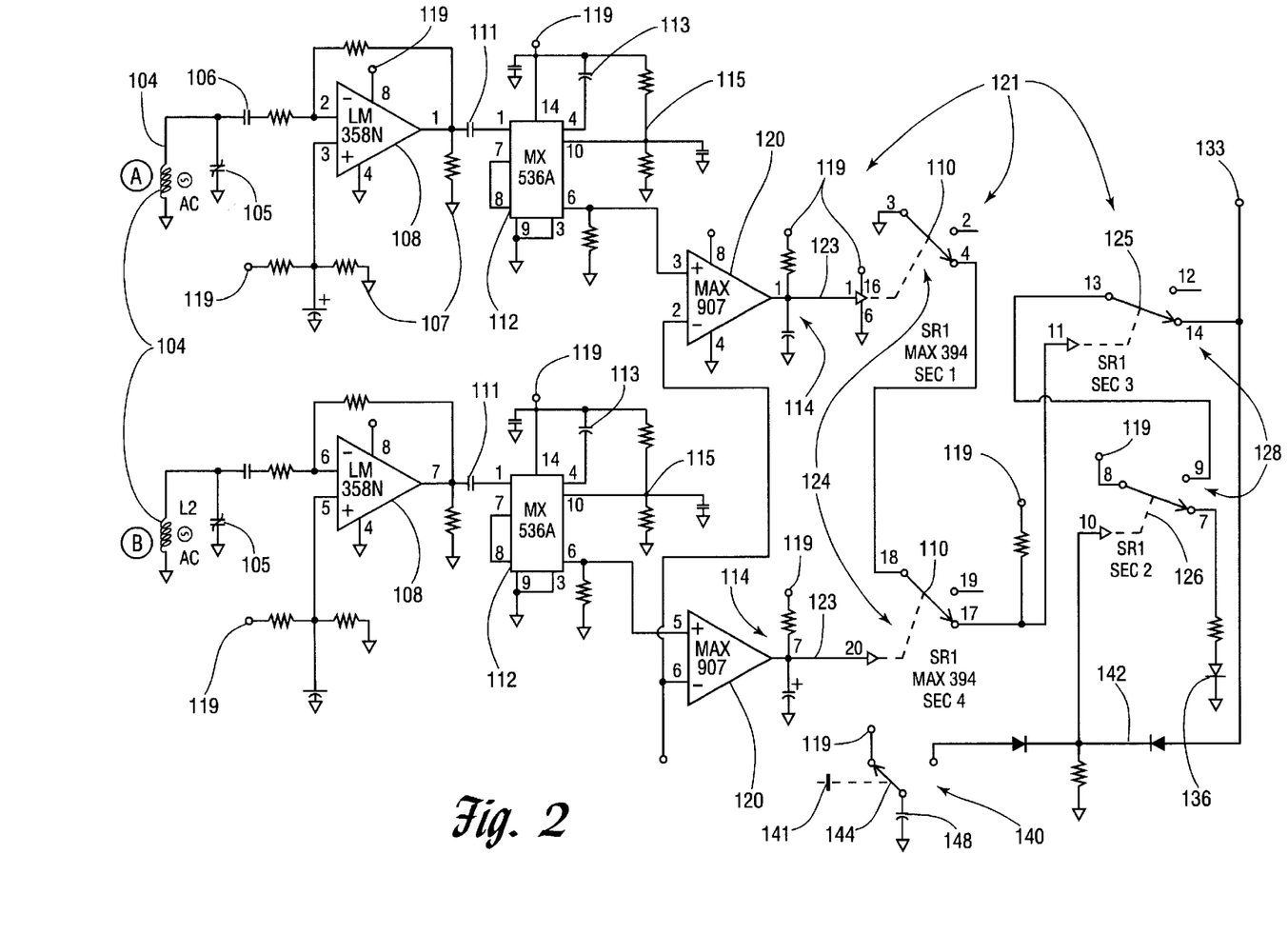
FIG. 2 is an electrical schematic diagram of a preferred embodiment in accordance with the block diagram of FIG. 1.
Figure 3:
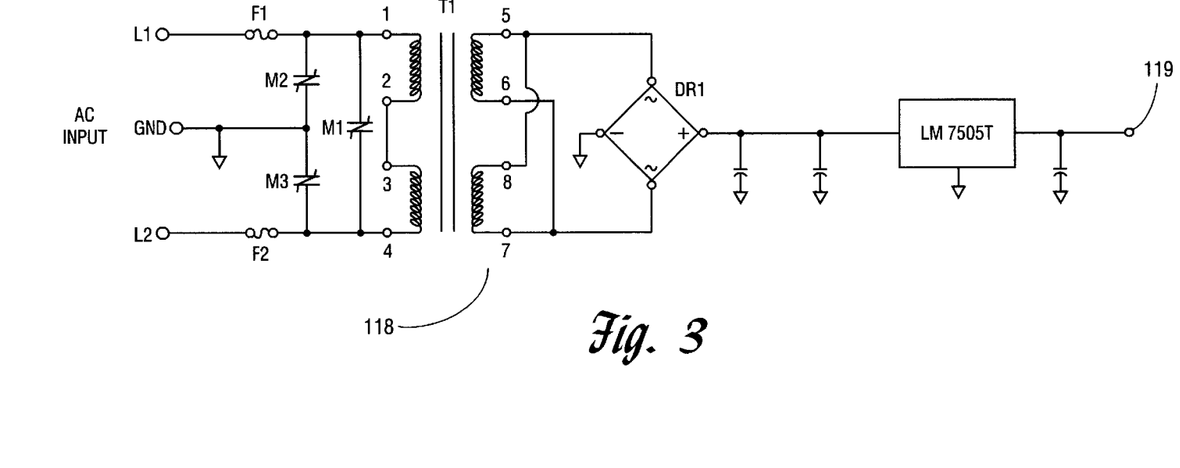
FIG. 3 is an electrical schematic diagram of a DC power supply appropriately used in accordance with one embodiment of this invention.

FIG. 2 provides a detailed arrangement of electrical circuitry that may be incorporated into one preferred embodiment of the invention. In this embodiment, the sensing devices are 50/60 Hz current transformers 104, which are appropriately used with standard 120 V residential power legs, to produce proportional AC signals depending on the magnitude of current flowing in each transformer's respective power leg. Such appropriately implemented devices include the Model CR8349-2500-N Current Transformers available from C&R Magnetics and the Model ASM-010 available from Talema Electronics. A metal oxide varistor 105 is electrically interposed between the AC output oft he current transformers 104 and ground for variably dampening the sensor signal produced by the transformers 104. The AC output from the current transformers 104 is also coupled to an operating amplifier circuit 107 through a first AC coupling capacitor 106. The amplifier circuit 107 is based on an amplifier 108 which in this embodiment is a standard non-inverting LM 358N operational amplifier chip. Such chips are well known in the art, are readily available from manufacturers such as National Semiconductor, Texas Instruments, and Motorola, and are frequently incorporated into electronic devices, as shown, with the use of an appropriate amplifier circuit 107 powered by the power supply voltage output 119. In this configuration, the amplifier 108 produces a characteristic gain of about ten and amplifies the AC sensor signal from the transformers 104 accordingly. Though amplified, the signal produced continues to vary in relative proportion to the magnitude of the current flowing through the power leg as detected by the current transformers 104, allowing other components oft he electric load limiter 100 to actively respond based on the level of current in a respective power leg.

The output of the amplifier 108 is coupled to a true RMS to DC converter 112 through a second AC coupling capacitor 111. In this embodiment, the RMS to DC converter 112 is based on a standard MX 536A converter unit, which is commonly available from manufacturers such as Analog Devices and Maxim Integrated Products. The converter 112 is configured within this embodiment of the invention with appropriate circuitry that depends upon the operational requirements of the converter unit used. In this embodiment, the required circuitry includes a reference voltage divider 115 and a converter capacitor 113 for establishing a signal frequency to which the MX 536A converter unit is responsive.

After AC to DC conversion by the converter 112, the amplified sensing signal is coupled to a logic circuit 121 for comparison with a reference signal representing the preselected maximum amount of current allowed by the utility company. The basic components of the logic circuit 121 include a voltage comparator 120, a logical output or OR circuit 124, and a logic switch circuit 128. In the embodiment of FIG. 2, the voltage comparator 120 is based on a standard Model 907 or 393 Low Power Dual Voltage Comparator device as are available from manufacturers such as Maxim Integrated Products, National Semiconductor, Texas Instruments, or Motorola.

The comparator is also coupled to the reference circuit 116 of FIG. 5 which produces the reference signal. In this embodiment, the reference circuit 116, powered by the power supply voltage output 119, includes six selectable voltage set-points 117 which may be alternatively preselected by the utility company. Each voltage set-point corresponds to a maximum level of current that the utility company may desire to permit a delinquent customer to continue to draw while the customer's bills remain overdue. The level selected will normally depend on the minimum current level that the utility company determines is required to maintain operation of the customer's essential electrically-operated services, such as refrigeration and heat.

Thus, in operation, the reference circuit 116 produces a direct current reference signal that has a voltage level equivalent in magnitude to the voltage level of the sensing signal produced by the current transformer 104, after amplification by amplifier 108 and AC to DC conversion by converter 112, when current passing through the transformer's respective power leg reaches the selected set-point level.

The voltage comparator 120 is configured so that it is unresponsive unless both sensing signals from the current transformer 104 and reference signals from the reference circuit 116 are in agreement, producing a low voltage state, or FALSE condition, during periods of disagreement between the signals. During further operation, a utility customer may begin to draw more current through a respective power leg than the selected maximum level. When this happens, the current transformer 104 on the respective power leg produces a sensor signal that is amplified by amplifier 108 and converted by converter 112 into a DC signal which increases in proportion to the increased magnitude of the sensor signal. The resulting increased sensor signal therefore rises to the preselected magnitude of the signal produced by the reference circuit 116, constituting agreement between the two signals. The voltage comparator is further configured so that it is responsive to such agreement, and produces a positive voltage, or TRUE condition. Thus, during operation, a low voltage state, or FALSE condition, indicates that the customer is drawing current below the level preselected in the reference circuit, and a high voltage state, or TRUE condition, indicates that the customer is drawing current that surpasses the preselected maximum level.

Where the load limiter is configured to monitor more than one power leg, the logic circuit 121 must be able to monitor a plurality of comparators 120 and still relate a high voltage state, or TRUE condition, when the delinquent utility customer draws a level of current exceeding the maximum preselected level of the reference circuit 116. In the embodiment of FIG. 2, the comparators 120 are each coupled to respective, individual switching logic devices 110 of a logical output, or OR circuit 124. RC Time Constant Circuits 114 are interposed between the comparators 120 and OR circuit 124 to prevent false tripping on high current transients. In the embodiment represented in FIG. 2 the individual switching logic devices are depicted as mechanical switching devices for the purpose of clarity in describing the functional operation of the OR circuit 124. It will be appreciated that in the preferred and other embodiments, equivalent switching logic operations are performed with a commercially available solid state switching device such as a Model 394 Low Voltage, Quad, SPDT, Cmos Analog Switch available from Maxim Integrated Products.

During operation, a delinquent customer draws electrical current through any one of the customer's incoming power legs. Each individual power leg is monitored by an individual, respective current transformer 104 that produces a signal amplified by an individual, respective amplifier 108 and converted by an individual, respective converter 120. Each signal is therefore proportional to the level of current flowing through its respective power leg and is compared individually with a separate comparator 120 to the preselected set-point level established by the reference circuit 116. So long as current drawn through all individual power legs remains below the preselected set-point level, all comparators 120 remain in a low voltage state, or FALSE condition. Each comparator 120 relates this condition to its respective switching logic device 110 in the OR circuit 124. In this embodiment, each switching logic device 110 will respond to the low state, or FALSE condition by remaining in a closed position (as shown), thereby relating a FALSE condition for the entire OR circuit 124, indicating that current flow in all monitored power legs remains below the maximum level preselected set-point level established by the reference circuit 116. However, once current flow through any one or more of the measured power legs rises to the preselected set-point level in the reference circuit 116, the respective comparator 120 for the one or more measuring power transformers 104 will detect an agreement in the magnitude of the amplified and converted sensor signal and the signal from the reference circuit 116. The power leg's respective comparator 120 will then assume a high voltage state, or TRUE condition. Responding to the changed condition of its respective comparator 120, the comparator's respective switching logic device 110 of the OR circuit 124 will itself switch to an open position, thereby changing the related condition of the entire OR circuit 124 to TRUE, and thereby indicating that any one or more of the monitored power legs is drawing more current than the preselected set-point level established by the reference circuit 116. Load limiting functions of the electric service load limiter 100 against all monitored power legs can therefore be based on the excessive current draw of any one or more individual power legs.

The logic circuit 121 effects load limiting functions through its logic switch circuit 128. The logic switch circuit 128 includes a first logic switch 125 and a second logic switch 126 for effecting and responding to high and low voltage states depending on the condition of the OR circuit 124 and/or the reset circuit 140. Although the embodiment of FIG. 2 depicts the first and second logic switches 125 and 126 as mechanical switching devices for the purpose of clarity in describing the functional operation oft he logic switch circuit 128, it will be appreciated that equivalent solid state switching logic devices can be appropriately implemented to carry out the equivalent logical operations of the circuit, and that in the preferred embodiment, such equivalent functions are carried out within a commercially available device such as a Model 394 Low Voltage, Quad, SPDT, Cmos Analog Switch as is available from Maxim Integrated Technologies.

Figure 6:
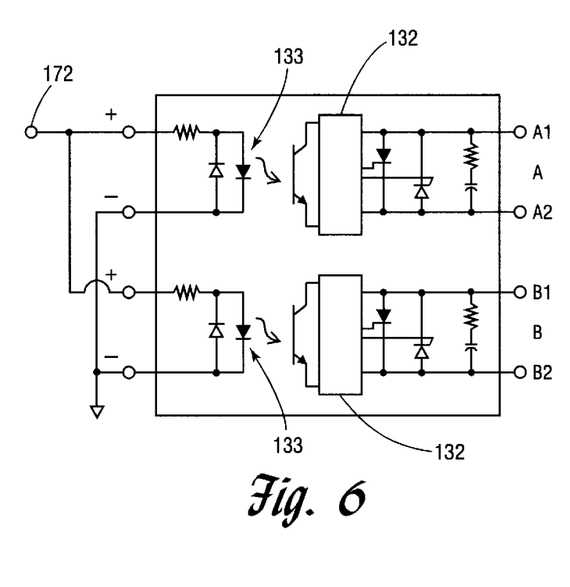
FIG. 6 is an electrical schematic diagram of an optional, electrically isolated dual solid state switching relay appropriately used in conjunction with a preferred embodiment of this invention.

In the embodiment of FIG. 2, the first logic switch 125 is coupled and responsive to the OR circuit 124. So long as electrical current flowing through each power leg remains below the set-point maximum level set in the reference circuit 116, the OR circuit 124 continues to assume a low voltage state, or FALSE condition. The first logic switch 125, being responsive to the state of the OR circuit 124, assumes a closed position (as shown) to connect positive voltage from the second logic switch 126 to the output 133 of the logic switch circuit 128 of the logic circuit 121. Referring briefly to FIG. 6, the output 133 is electrically isolated from the individual power relay switches 132 that are each coupled to one respective power leg and are configured to permit current to pass through each respective power leg so long as the positive voltage condition of the output 133 is maintained. The electrically isolated configuration is achieved with a commercially available unit such as a Model 2425 Dual Solid State Relay SCR Output (240V, 25A) or a Model 24025 Solid State Relay SCR Output (240V, 25A), commonly available from various manufacturers including Siemens, Opto 22, Crydom Corp., and Teledyne Relays.

Referring again to FIG. 2, in the event that the amount of electrical current flowing through any one power leg rises above the set-point maximum level set in the reference circuit 116, the OR circuit 124 assumes a high voltage state, or TRUE condition. Being responsive to the state of the OR circuit 124, the first logic switch 125 switches to its open position, thereby removing positive voltage to the output 133 of the logic switch circuit 128 of the logic circuit 121. Referring again briefly to FIG. 6, the individual power relay switches 132, responsive to the charged condition of the electrically isolated output 133, automatically remove electrical continuity within the respective power legs in the absence of a charged condition of the output 133. Therefore, current drawn in excess of the set-point level of the reference circuit 116 in any one power leg results in the logic circuit 121 effecting electrical discontinuity in all power legs. Consequently, overloading any one power leg leads to the disruption of all of the delinquent customer's electrical service.

In the embodiment of FIG. 2, such a disruption also initiates a visual indication of the suspension of electrical service. The second logic switch 126 is interposed between the power supply voltage 119 and the light emitting diode fault indicator 136. The second logic switch 126 is also responsive to the charged condition of the output 133 of the logic switch circuit 128 of the logic circuit 121, so that a charged condition of the output 133 will induce the second logic switch 126 to remove the fault indicator 136 from the power supply voltage 119. In the event that the amount of electrical current flowing through one or more power legs results in the removal of positive voltage to the logic switch circuit output 133, the absence of charge induces the second logic switch 126 to connect the fault indicator 136 to the power supply voltage 119 and illuminate into a visible indication of the disruption. This indication serves to confirm to the delinquent customer that he must undertake to reduce electrical consumption and then reset the service load limiter 100.

FIG. 2 depicts an appropriate embodiment of a reset circuit 140 for implementation in the invention. The basic components of the reset circuit include a customer operated reset switch 144, a reset capacitor 148, and a reset circuit output 142. The reset switch 144 is interposed between the reset capacitor 148, power supply voltage 119 and reset circuit output 142. The reset switch 144 is also switchably biased to provide an electrical interconnection between the power supply voltage 119 and reset capacitor 148, and is further configured to alternatively disconnect the power supply voltage 119 and provide electrical interconnection between the reset capacitor 148 and reset circuit output 142 upon manual activation by the customer. The reset circuit output 142 is coupled to the second logic switch 126 to operably effect the switch's condition.

In operation, the biased interconnection by the reset switch 144 between the power supply voltage 119 and reset capacitor 148 serves to maintain the reset capacitor 148 in a charged state. In the event that the amount of electrical current flowing through any one power leg rises above the set-point maximum level set in the reference circuit 116, the OR circuit 124 assumes a high voltage state, or TRUE condition. The first logic switch 125 responds to the state of the OR circuit 124 by switching to its open position, thereby removing positive voltage from the output 133 of the logic switch circuit 128. In the absence of positive voltage at the output 133, the second logic switch 126 connects the power supply voltage 119 to the fault indicator 136 to indicate a suspension of electrical service. This disruption of electrical service terminates the high voltage state of the OR circuit 124, permitting the first logic switch 125 to return to its closed condition (as shown). The customer's manual operation of the reset switch disconnects the reset capacitor 148 from the power supply voltage 119 and alternatively connects the reset capacitor 148 to the reset circuit output 142. Being disconnected from the power supply voltage 119, the reset capacitor 148 discharges to the reset circuit output 142 and loses its stored charge. However, this capacitor discharge induces the second logic switch 126 to disconnect the power supply voltage 119 from the fault indicator 136, thereby reconnecting power supply voltage 119 to the first logic switch 125. Having resumed its open condition during the suspension of electrical service, the first logic switch 125 reconnects the positive voltage to the output 133 of the logic switch circuit 128, thereby inducing the individual power relay switches 132 to restore electrical service by reestablishing electrical continuity in their respective power legs.

In accordance with the principles of the invention, this embodiment prevents a delinquent customer from bypassing the need to manually operate the reset switch 144 after each disruption. After electrical service is suspended due to excessive current flow through one or more power legs, the second logic switch 126 will disconnect the power supply voltage 119 from the first logic switch 125, preventing the first logic switch 125 from providing a charge at the output 133 of the logic switch circuit 128. To induce the second logic switch 126 to reconnect the power supply voltage 119 to the first logic switch 125, the reset circuit 140 must provide a signal from the reset capacitor 148. Before manual operation of the reset switch 144, the reset switch is switchably biased to interconnect the reset capacitor 148 to the power supply voltage 119 (as shown), thereby maintaining the reset capacitor 148 in a charged condition. Manual operation of the reset switch 144 disconnects the reset capacitor 148 from the power supply voltage 119, thereby preventing recharging of the reset capacitor 148 after the initial discharge to the reset circuit output 142 caused by the manual operation of the reset switch 144. In the event that a delinquent customer attempts to bypass the reset switch 144 by securing the switch to maintain an electrical interconnection between the reset capacitor 148 and the reset circuit output 142, further charging of the reset capacitor 148 by the power supply voltage 119 becomes impossible. The initial discharge of the reset capacitor 148 will induce the second logic switch 126 to restore positive voltage to the first logic switch 125 and output 133 of the logic switch circuit 128, thereby inducing the individual power relay switches 132 to restore electrical service by reestablishing electrical continuity in their respective power legs. However, in the event of a subsequent disruption, the reset capacitor 148, though electrically connected to the reset circuit output 142 by the secured reset switch 144, will nevertheless be unable to provide further charge to the second logic switch 126 to effect restoration of electrical service. Only by releasing the reset switch 144 to its biased position (as shown) can the delinquent customer recharge the reset capacitor 148. The signal voltage needed to effect operation of the second logic switch 126 can then only be discharged to the reset circuit output 142 by again manually operating the reset switch 144 completely. For this reason, simple bypassing of the reset circuit by securing the reset switch in a fixed position will effectively disable the circuit's ability to reset and restore electrical service to the delinquent customer.

Consider a situation in which a customer, desiring to prevent tripping of the service load limiter, attempts to permanently activate the reset switch 144 by positioning it in its reset position with a piece of tape, chewing gum, or similar means. In doing this, the reset switch will effectively disconnect all electrical continuity between reset capacitor and the power supply 118. The capacitor will be unable to recharge without a connection to the power supply 118, and as a result, will be unable to send a reset signal to logic switch 128. For this reason, the customer will be unsuccessful in overcoming subsequent tripping of the service load limiter unless he physically deactivates and then reactivates the reset switch 144, thereby recharging the reset capacitor and providing for another reset signal to be discharged to the logic switch 128. The customer must continue traveling to the inconvenient location of the reset switch 144 each time his current draw exceeds the predetermined level established by the reference circuit 116. Eventually, the customer will become frustrated with the extreme inconvenience of continually resetting the circuit and will be motivated to either limit his electricity consumption or pay his bill.

Figure 9:
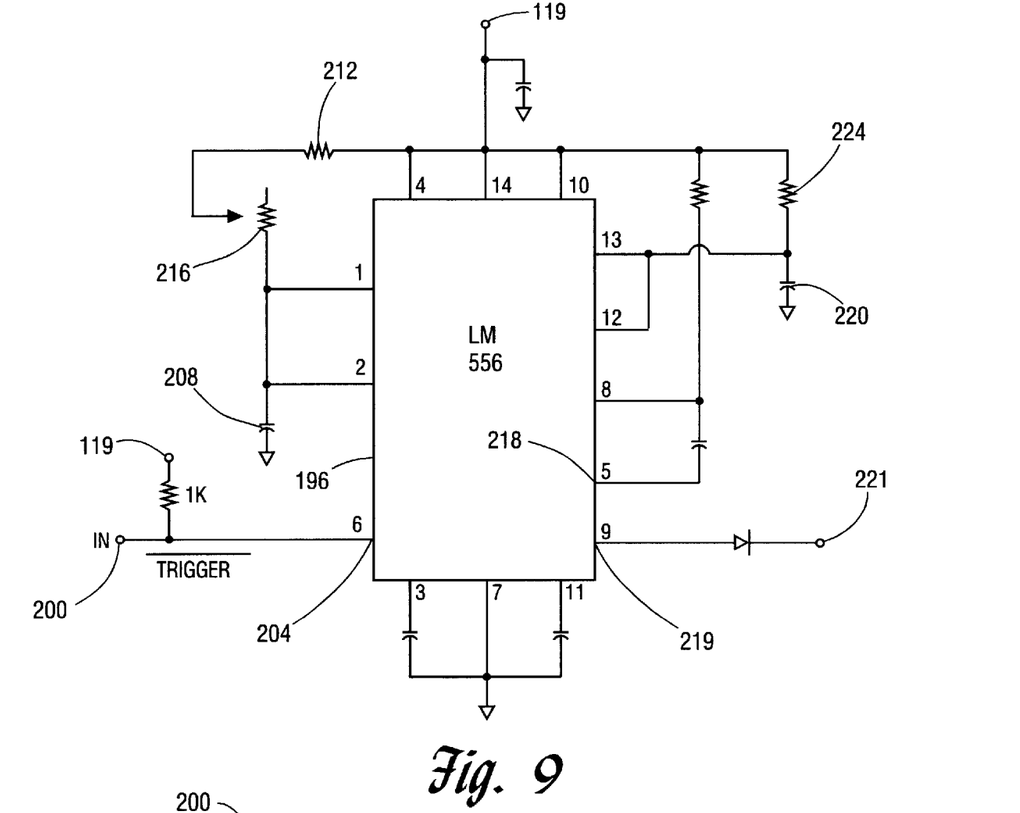
FIG. 9 is an electrical schematic diagram of an optional, automatic reset circuit for providing time-delay resetting of the service load limiter according to an alternate embodiment of this invention.
Figure 10:
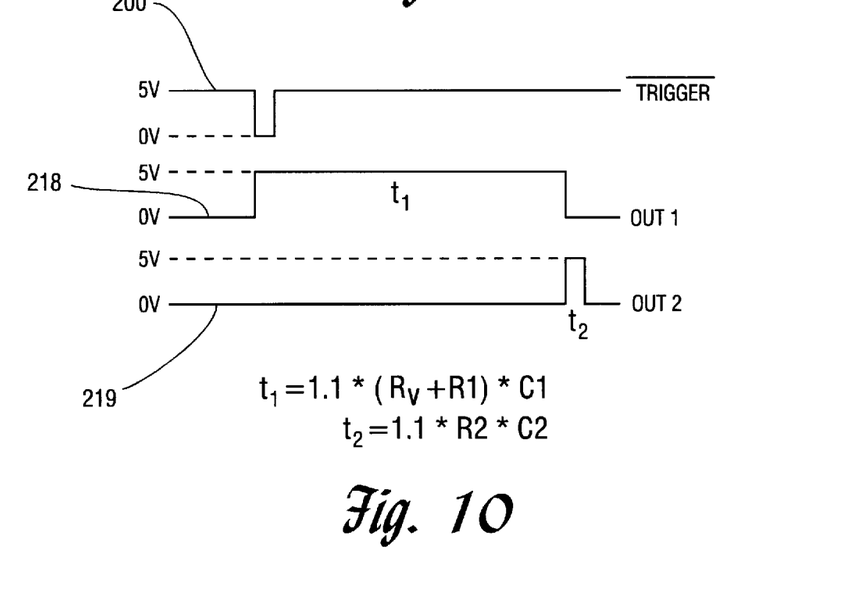
FIG. 10 is a graphical representation of the relative timing conditions of the electrical outputs contained in the automatic reset circuit of FIG. 9; and TABLE 1 illustrates logical parameters for the current limiter logic circuit of FIG. 4 in an alternate embodiment of this invention.

One alternate embodiment of the invention achieves the effect of interrupting a customer's electric service without requiring the customer to manually reset the circuit after each interruption. FIG. 9 depicts an adjustable automatic reset circuit for automatically resetting the load limiter after a selected time delay. The adjustable automatic reset is constructed around a standard dual-timing circuit chip 196, such as an LM556, ICM556, or other comparable chip, which are very commonly available from manufacturers such as National Semiconductor and Maxim Integrated Technologies. The chip is responsive to the condition of logic switch 128, shown in FIGS. 1 and 2, through circuit input 200 and input pin 204. The timing circuit chip 196 initially shorts a first timer capacitor 208 connected to power supply 118, until a LOW (0V) trigger impulse is received through input pin 204, indicating an overload condition. Responding to the trigger impulse, the timing circuit chip 196 releases the short of first timer capacitor 208. The first timer capacitor 208 then begins to charge through the series of the first fixed timing resistor 212 and variable timing resistor 216. The rate at which charging of first timer capacitor 208 occurs depends on the combined resistances of first fixed timing resistor 212 and variable timing resistor 216. The timing circuit chip 196 permits continued charging of the first timing capacitor 208 for a time $t_1$ until charge on the first timing capacitor 208 reaches two-thirds of the supply voltage, as defined by power supply 118, through the relation $$t_1=1.1*(R_V+R_1)*C_1$$

where $R_V$ is the variable resistance of variable timing resistor 216, $R_1$ is the resistance of fixed timing resistor 212, and $C_1$ is the capacitance of first timing capacitor 208. Since time $t_1$ is directly proportional to the combined resistances of $R_V$ and $R_1$, a change in the value of $R_V$ through selective adjustment of variable timing resistor 216 will permit variable selection of the charging time of the first timing capacitor 208, as represented in FIG. 10.

Once the charge on first timing capacitor 208 reaches two-thirds of the supply voltage, the timing circuit chip 196 discharges the first timing capacitor 208 to ground and concurrently sets a second output 219 to a HIGH (5V) state. This HIGH setting of the second output 219 results in the discharge of a positive voltage signal being discharged through circuit output 221, to which the logic switch 128 of FIGS. 1 and 2 is responsive. Upon discharge of the first timing capacitor 208, the timing circuit chip 196 also initiates charging of a second timing capacitor 220 through a second fixed timing resistor 224 by setting first output 218 to a LOW (0V) condition. The second timing capacitor 220 will generally have a capacitance that is of a much smaller magnitude than the first timing capacitor 208. Thus, the time $t_2$ for charging the second timing capacitor 220 to two-thirds of the supply voltage is of a much shorter duration than for the first timing capacitor 208, as established by the relation $$t_2=1.1*R_2*C_2$$

where $R_2$ is the resistance of second fixed timing resistor 224 and $C_2$ is the capacitance of second timing capacitor 220. Once second timing capacitor 220 has, after a time $t_2$, accumulated a charge that is two-thirds of the supply voltage, the timing circuit chip 196 discharges the second fixed timing resistor 224 to ground and sets the second output 228 to a LOW (0V) condition, thereby terminating the reset signal to logic switch 128 after a time $t_2$. As set forth in FIG. 10, the relative conditions of the first output 218 and second output 219 thereby permit a selective time delay before the circuit automatically resets the load limiter. It follows that, in the event of an overload condition, a selected temporary disconnection period can serve as an incentive for customer payment without requiring manual resetting by the customer.

Once the customer pays his bill, the utility company may wish to discontinue the current limiting operation of the load limiter adapter and restore full electric service to the customer. Alternatively, the utility company may wish to terminate all service if the customer is temporarily absent or moves away from the building by disconnecting all electrical service. One embodiment of the invention allows the utility company to set the service load limiter to either of these operational modes, or alternatively, to return the load limiter to its current limiting mode. The current limiter logic circuit 160 in FIG. 4 has a signal input 164 for receiving positive voltage from the logical switch 128 in FIG. 1. The current limiter logic circuit 160 of FIG. 4 also has a signal output 168 for connecting to the power relay switch input 172 in FIG. 1. This interposition between the logic switch 128 and power relay switches 132 allows the current limiter logic circuit 160 to selectively maintain the service load limiter in an ON or OFF mode whenever the utility company chooses not to limit electric consumption by the customer. As is best understood with reference to FIG. 4, the utility company effects control of the current limiter logic circuit 160 with an automatic meter reader (not shown) or other remotely controlled device. The controlling device passes controlling logic signals that alternate between high (5V) and low (0V) states to the circuit through logic pins 176, effecting the load limiter's operational mode according to the truth table in TABLE 1.

Figure 4:
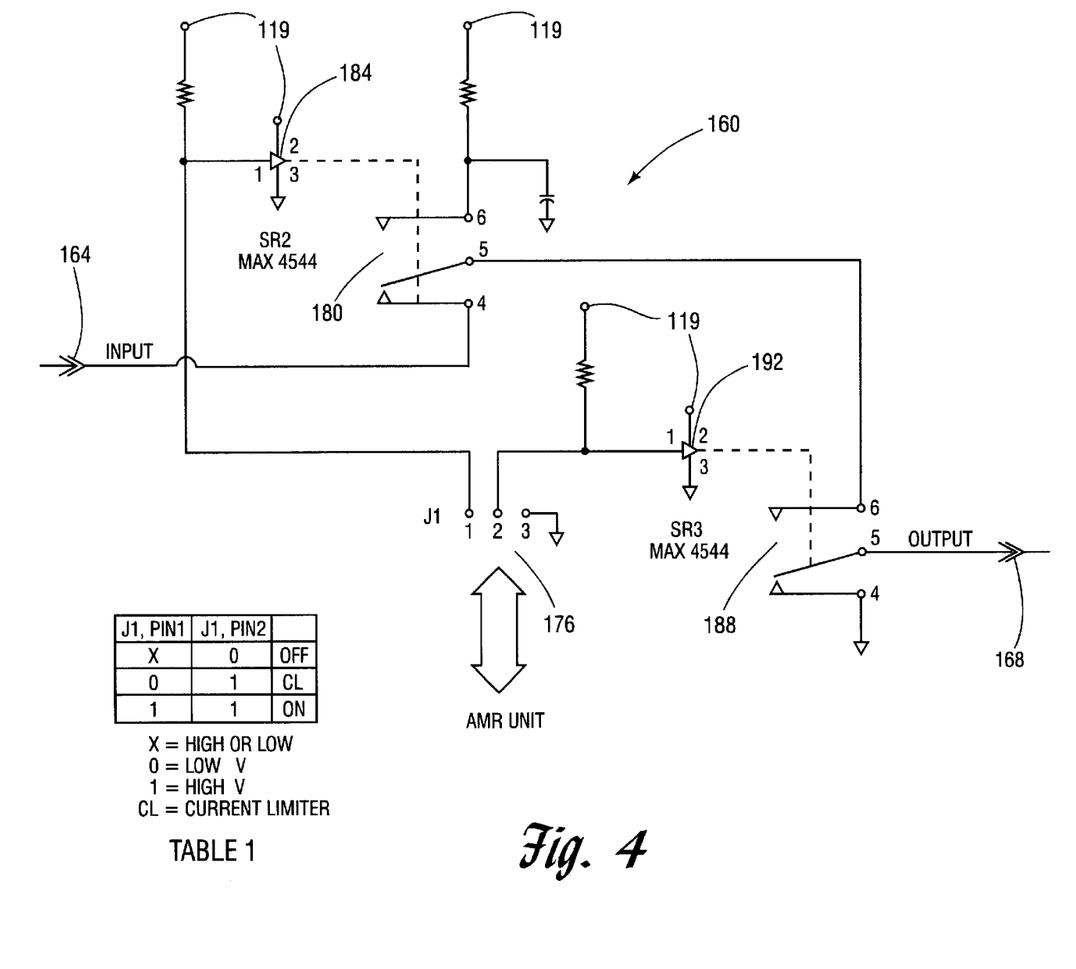
FIG. 4 is an electrical schematic diagram of a current limiter logic circuit appropriately used in accordance with various embodiments of this invention.

For clarity in understanding the logical operation of the circuit, FIG. 4 depicts a circuit having an input amplifier 184 and a mechanical input relay switch 180. FIG. 4 also depicts an output amplifier 192 and a mechanical output relay switch 188. Although the depiction of a mechanically-operated device clarifies circuit operation in this description, it will be appreciated that in the preferred embodiment, the equivalent task of each input or output amplifier & relay switch combination will be performed with a single solid state device such as a CMOS relay chip or other commercially available apparatus.

Consider a situation in which the utility company chooses to remove all restrictions on the customer's electric service and to allow the customer to draw as much current as desired. The company will relate its instructions to the customer's automatic meter reader which will in turn turn ON the load limiter by placing the first and second of logic pins 176 (Pins 1 & 2) in a high state (5 Volts). The high state of both pins will activate both the input relay switch 180 and the output relay switch 188, or their solid state equivalents, thereby connecting signal output 168 to positive voltage 118. As a result, power-removing relays 132 will be continuously connected to positive voltage 118 and will continue to allow current to flow through the building's power legs without disruption. If the company later chooses to begin limiting the amount of electricity that the customer draws, it will relate instructions to the automatic meter reader that place the first of logic pins 176 (Pin 1) at a low state (0V) and the second of logic pins 176 (Pin 2) at a high state (5V). The low state of the first of logic pins 176 (Pin 1) will leave input relay switch 180 deactivated, thereby preventing connection between constant positive voltage 118 and power-removing relays 132. The high state of the second of logic pins 176 (Pin 2) will activate output relay switch 188, or its solid state equivalent, so that a deenergized electrical connection exists between signal input 164 and signal output 168. Power-removing relays 132 will then remain responsive to the current limiting logic of the service load limiter, preventing excessive current draw by the customer. Eventually, the customer may vacate the building. If the utility company then wishes to disconnect all electrical service, it has the option of setting the automatic meter reader so that the load limiter's operational mode is OFF. The company will relate instructions to the automatic meter reader so that the second of logic pins 176 (Pin 2) is set to a low state (0V), thereby deactivating output relay switch 188. Deactivation of output relay switch 188 will effectively ground relay input 172 and prevent the power-removing relays 132 from receiving either continuous direct current or selective current from the logic circuit. As a result, current flow through the building's power legs will be constantly disrupted. Thus, depending on the selected embodiment of the invention, the electric company may be able to not only remotely determine the maximum amount of current a consumer can draw, but also select whether the customer's usage is to be totally restricted or unrestricted.

Figure 7:
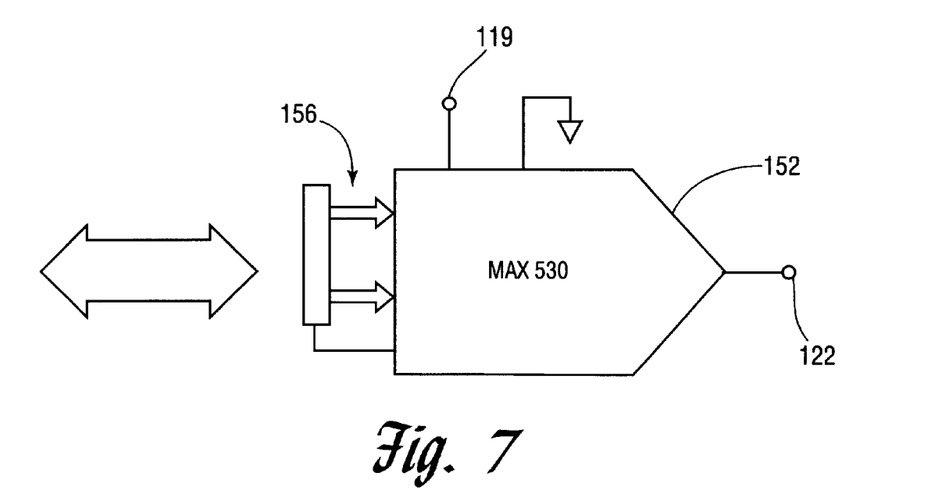
FIG. 7 is a bloc diagram of an optional, remote controlled current set-point circuit for receiving parallel data logic and for setting the predetermined maximum level of electricity consumption according to an alternate embodiment of this invention.

In some embodiments, variable selection of the set-point level of reference circuit 116 may also be made from a central location, such as a business office or utility station with the use of a remote controlled device. FIG. 7 illustrates a 12-bit digital-to-analog voltage converter 152 for interfacing and receiving parallel data logic through parallel data port 156. In this embodiment of the invention, the digital-to-analog voltage converter 152 replaces a voltage divider shown in FIG. 5 or other means for variably selecting the maximum set-point value. Parallel logic may be supplied by a 4-bit, 8-bit, or 16-bit microprocessor modem device unit such as an automatic meter reader (not shown). It will be appreciated by those skilled in the art that other remotely controlled devices may be used to supply logic necessary for operation of the digital-to-analog converter 152. The digital-to-analog converter 152 is powered through the output 119 of power supply 118, shown in FIG. 5, and produces a reference signal at output 122 based on the remotely-communicated data logic received through parallel data port 156.

Figure 8:
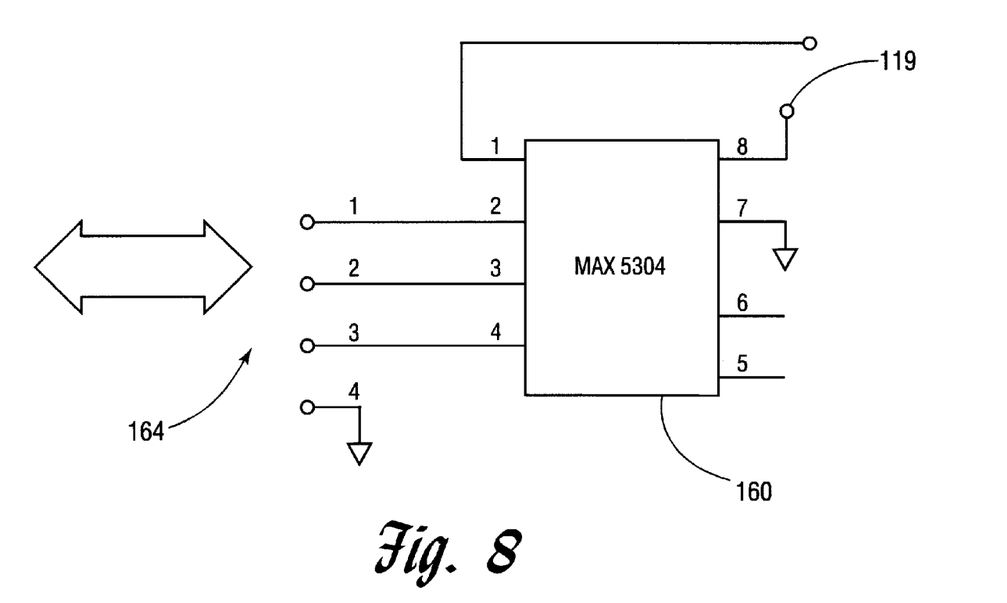
FIG. 8 is a block diagram of an optional, remote controlled current set-point circuit for receiving serial data logic and for setting the predetermined maximum level of electricity consumption according to an alternate embodiment of this invention.

FIG. 8 illustrates a similar 10-bit digital-to-analog voltage converter 160, also powered through power supply 118, shown in FIG. 5, for interfacing and receiving serial data logic through serial data port 164 and for producing a corresponding reference signal. Existing digital-to-analog converters that are commercially available and appropriately integrated into remotely operated embodiments of the invention described include the MAX530 (12-bit parallel data) and MAX5304 (10-bit serial data) digital-to-analog converters from Maxim Integrated Technologies, though other models, designs, and apparatuses may be similarly incorporated to carry out the equivalent function.

This invention has been explained with respect to the details, arrangements of components and certain specific embodiments shown in the accompanying drawings. Many modifications can be made to these embodiments to those skilled in the art without departing from the spirit and scope of this invention. Thus, the appended claims are intended to be interpreted to cover such equivalent electric service load limiters which do not depart from the spirit and scope of this invention.

What is claimed is:

1. An electric service load limiter for limiting the level of electric current received by a consumer from a utility power line and flowing through the consumer's electric power circuit, comprising:

a sensor responsive to the power circuit for producing a sensor signal proportionate to the level of current flowing from the utility power line and through the consumer's electric power circuit;

a logic circuit coupled to said sensor and responsive to the sensor signal to produce a logic signal when the sensor signal indicates the level of current being drawn through the consumer's electric power circuit which is equal to or greater than a desired maximum level;

an automated power switch connectable between the utility power line and the consumer electric power circuit and coupled to said logic circuit, said automated power switch being operable to couple current from the utility power line to the consumer electric power circuit and responsive to said logic circuit to interrupt the flow of current from the utility power line to the consumer electric power circuit when a logic signal is produced; and a reset circuit coupled through said logic circuit to said automated power switch to produce a single reset signal, which is limited in duration, each time said reset circuit is operated after the interruption of current flow from the utility power line so as to cause said automated power switch to couple current from the utility power line to the consumer's electric power circuit.

2. An electric service load limiter according to claim 1 wherein said reset circuit includes a manual switch operable by the consumer that has a first condition and a second condition, said reset circuit producing a reset signal only upon the operation of said manual switch from said first condition to said second condition so as to cause said automated power switch to couple current from the utility power line to the consumer's electric power circuit, said manual switch being returnable from said second condition to said first condition so that after said automated power switch interrupts the flow of current from the utility power line to the consumer's electric power circuit, said manual switch can be operated to produce a reset signal to cause said automated switch to couple current from the utility power line to the consumer's electric power circuit.

3. An electric service load limiter according to claim 1 wherein said reset circuit is automatically operated a selected period of time after said automated power switch interrupts the flow of current from the utility power line to the consumer's power circuit, said reset circuit configured to automatically cause said automated power switch to couple current from the utility power line to the consumer's electric power circuit after the selected period of time.

4. An electric service load limiter according to claim 1 wherein said logic circuit further comprises:

the sensor signal having a magnitude proportional to the level of current flowing from the utility power line and through the consumer's electric power circuit, a reference circuit for producing a reference signal equal in magnitude to the sensor signal produced when current flowing from the utility power line to the consumer's electric power circuit is at the desired maximum level; and a comparator coupled to said reference circuit and said comparator further coupled to said sensor for comparing the magnitude of the sensor signal with the magnitude of the reference signal and configured to produce a comparator signal when the magnitude of the sensor signal equals or exceeds the magnitude of the reference signal.

5. An electric service load limiter according to claim 1 wherein the sensor comprises a transformer that is coupled to the consumer's power circuit and that produces a sensor signal proportional to the level of the electric current flowing through the electric utility power line to the consumer's power circuit.

6. An electric service load limiter according to claim 1 which includes a remote control limit device which enables the desired maximum level of current flowing through the consumer's electric power circuit to be selectably set from a remote location.

7. An electric service load limiter according to claim 1 which has a plurality of power legs, with each power leg having a respective sensor, logic circuit, and automatic power switch.

8. An electric service load limiter according to claim 1 in which said sensor comprises a transformer and said automated power switch is electrically isolated from said logic circuit.

9. An electric service load limiter according to claim 1 wherein said reset circuit includes a manual switch which has a first condition and a second condition and an electrical capacitor which is charged when said manual switch is in the first condition and is discharged when said manual switch is in the second condition, said reset circuit producing a reset signal due to the discharge of said electrical capacitor upon the operation of said manual switch from said first condition to said second condition so as to cause said automated power switch to couple current from the utility power line to the consumer's electric power circuit, said manual switch being returnable from said second condition to said first condition to allow said capacitor to charge so that after said automated power switch interrupts the flow of current from the utility power line to the consumer's electric power circuit, said manual switch can be operated to produce a reset signal to cause said automated power switch to couple current from the utility power line to the consumer's electric power circuit.

10. An electric service load limiter according to claim 1 in which said logic circuit has an output having a first condition and having a second condition that occurs in response to the sensor signal and in which said first condition causes said automated power switch to couple current from the utility power line to the consumer power circuit and said second condition produces a logic signal that causes said automated power switch to interrupt the flow of current from the utility power line to the consumer electric power circuit.

11. An electric service load limiter according to claim 1 further comprising an amplifier connected between said sensor and said logic circuit for receiving and increasing the magnitude of the sensor signal in measurable proportion to the amount of current flowing from the utility power line and through the consumer's electric power circuit.

12. An electric service load limiter according to claim 1 wherein said reset circuit includes a timing circuit which operates said reset circuit a selected time delay after said automatic power switch interrupts the flow of current from the utility power line to the consumer's electric power circuit to cause said automated power switch to couple current from the utility power line to the consumer's electric power circuit after the selected time delay, said timing circuit including a control which enables the duration of the selected time delay to be determined.

13. An electric service load limiter according to claim 1 which includes a remote controlled device coupled to said electric service load limiter to turn on said electric service load limiter to cause it to limit the level of electric current flowing through the consumer's electric power circuit and to turn off said electric service load limiter.

14. An electric service load limiter according to claim 1 which includes a remote controlled device coupled to said electric service load limiter to turn on said electric service load limiter to cause it to limit the level of electric current flowing through the consumer's electric power circuit and to turn off said electric service load limiter; said remote controlled device further configured to select a desired maximum level of current to flow through the consumer's electric power circuit.

15. A method of limiting the amount of electricity flowing from a utility power line to a consumer electric power circuit comprising:

selecting a desired maximum level of electric current to be permitted to be drawn from the utility power line and through the consumer electric power circuit and producing an electric reference signal having a magnitude corresponding to the selected maximum desired level of current flowing through the utility power line to the consumer electric power circuit;

using a sensor to detect the level of current being drawn through the utility power line to the consumer's electric power circuit and producing a sensor signal having a magnitude proportionate to the amount of current detected by the sensor;

comparing the magnitude of the sensor signal with the magnitude of the reference signal;

disconnecting the utility power line from the consumer electric power circuit when the amount of current being drawn through the utility power line equals the desired maximum level of current; and enabling a reset signal of a limited duration to be produced and enabling this reset signal to cause the utility power line to be reconnected to the consumer electric power circuit only if the reset signal is produced after the utility power line has been disconnected from the consumer electric power circuit.

16. A method for limiting the amount of electricity flowing from a utility power line to a consumer electric power circuit according to claim 15 which includes enabling the reset signal of a limited duration to be produced by a manual switch available to be operated by a consumer.

17. A method for limiting the amount of electricity flowing from a utility power line to a consumer electric power circuit according to claim 15 which further includes producing a reset signal of a limited duration a selected time delay after the utility power line is disconnected from the consumer power electric power circuit.

18. A method for limiting the amount of electricity flowing from a utility power line to a consumer electric power circuit according to claim 15 in which the selecting of a desired maximum level of electric current to be permitted to be drawn takes place at the location of a consumer.

19. A method for limiting the amount of electricity flowing from a utility power line to a consumer electric power circuit according to claim 15 in which the selecting of a desired maximum level of electrical current to be permitted to be drawn takes place at a location remote from the location of a consumer electric power circuit.

\* \* \* \* \*